Patented July 26, 1949

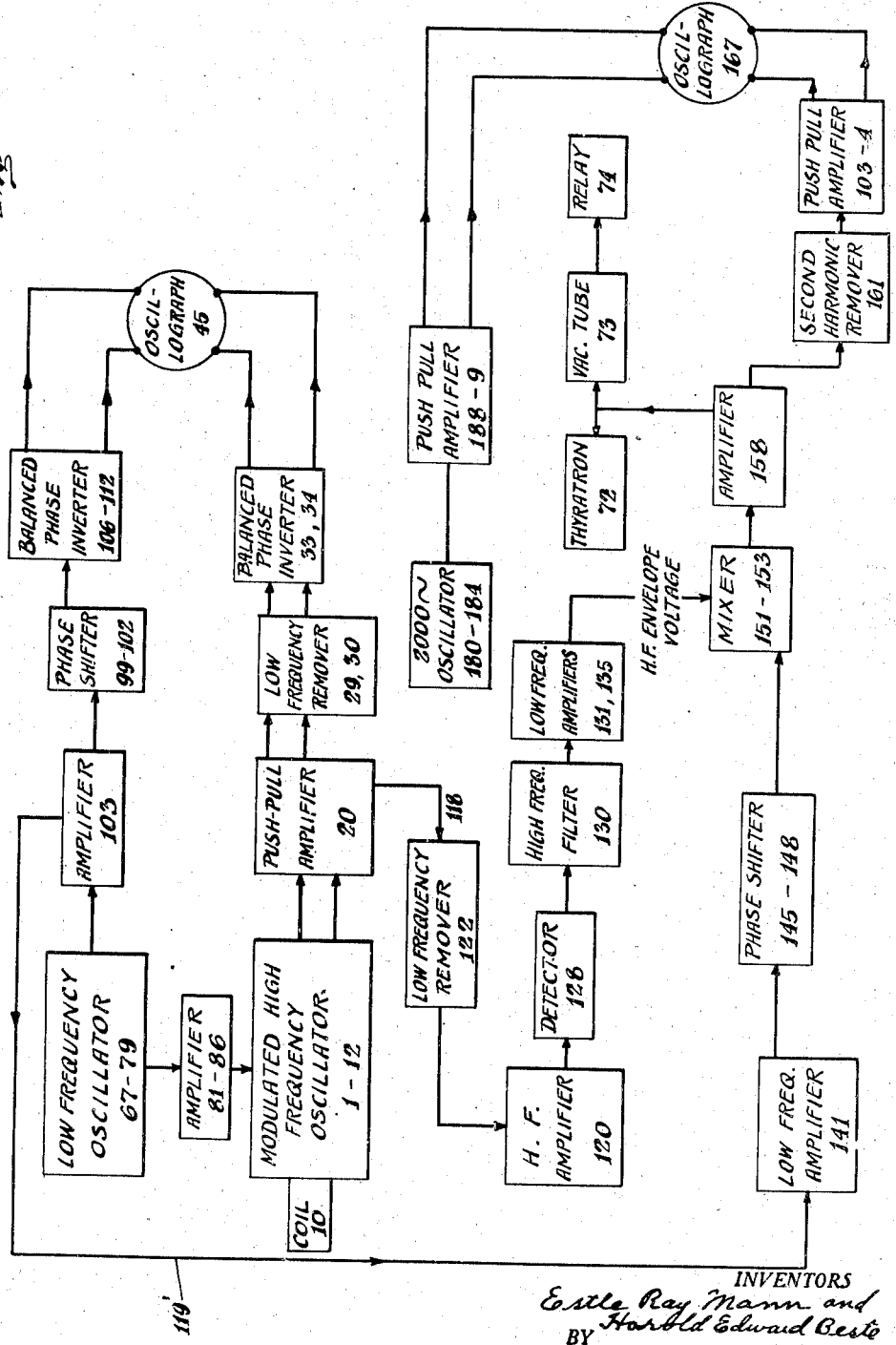

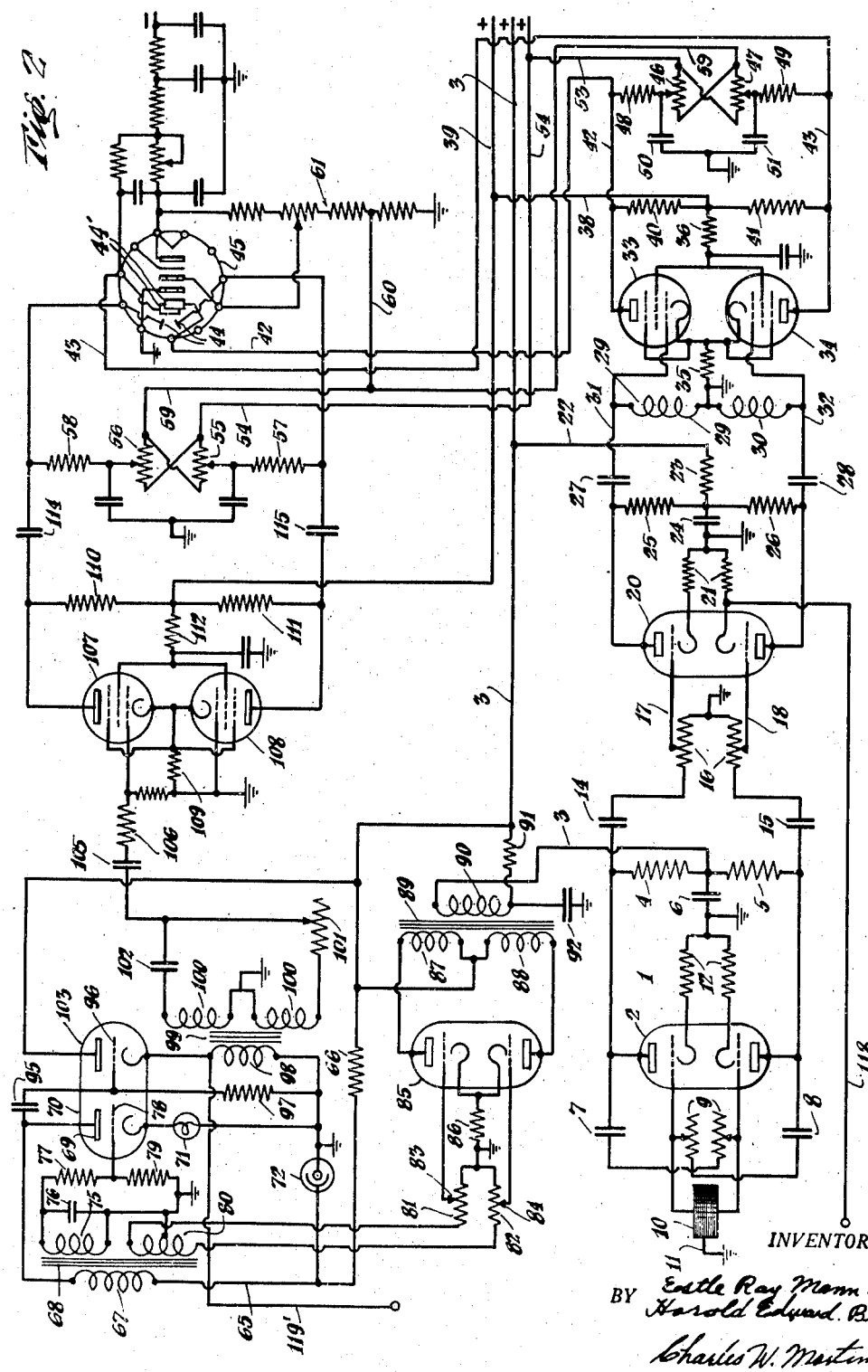

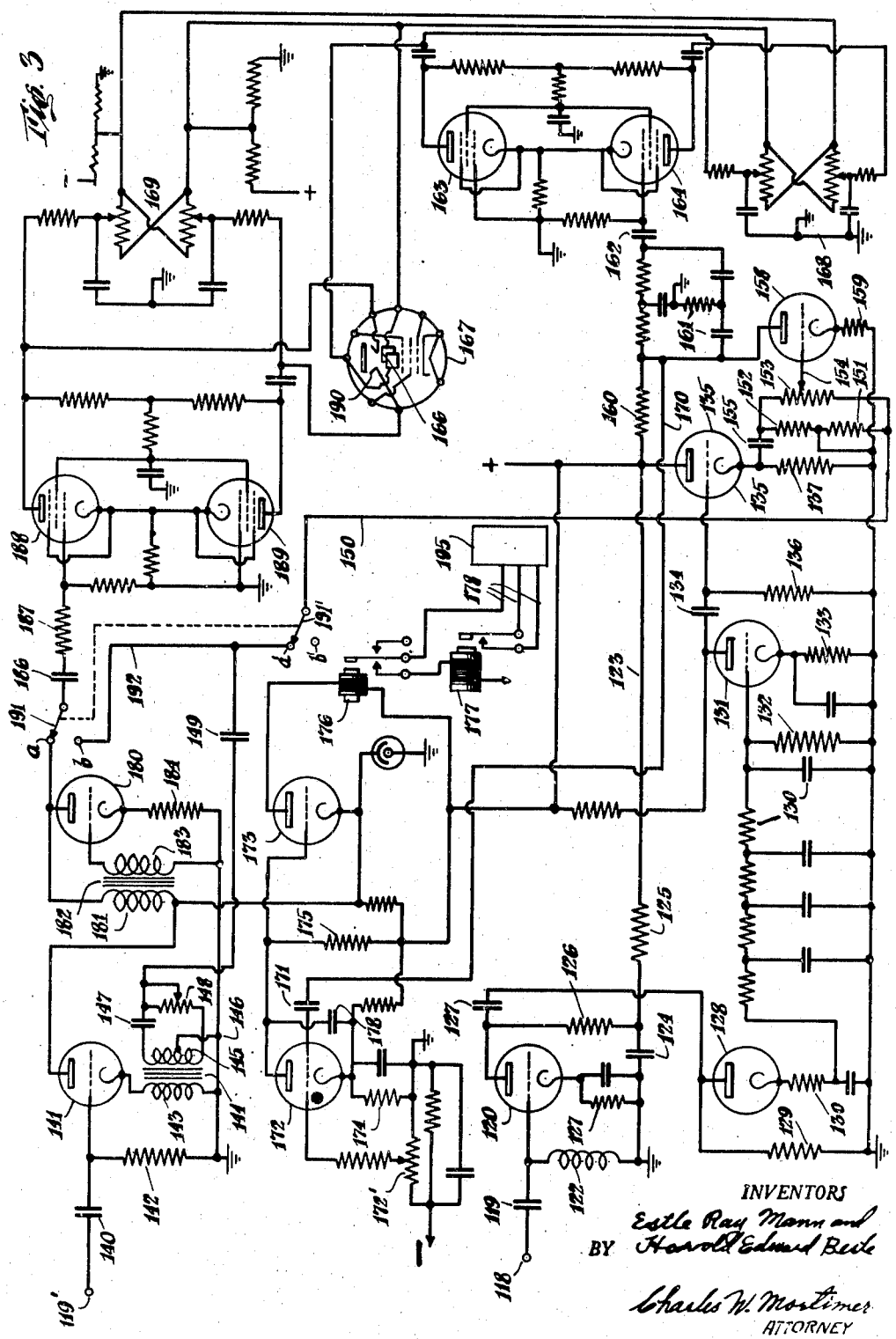

2,477,384

UNITED STATES PATENT OFFICE 2,477,384

CYCLOGRAPH FOR TESTING METALS

Estle Ray Mann, Upper Montclair, and Harold Edward Beste, East Rutherford, N. J., assignors to Allen B. Du Mont Laboratories, Inc., Passaic, N. J., a corporation of Delaware Application November 9, 1943, Serial No. 509,576

2 Claims. (Cl. 175—183)

This invention relates to a device for testing metals by passing them through an inductance coil and utilizing the effects thereby produced upon a high frequency oscillator that is modulated by low frequency oscillations. The modulated high frequency is rectified and the rectified signal is mixed with a portion of the original low frequency oscillations. The resultant signal is used to initiate a gaseous discharge device causing relays to operate to actuate devices to separate the metals according to their physical properties.

It is well known that the effective resistance of a coil carrying alternating current and surrounding a piece of metal depends on several factors, i. e. the D. C. resistance of the wire, and additional resistive component of the wires due to skin effect, which increases with frequency, and a resistive component which represents the losses in the piece of metal due to eddy currents induced therein and losses due to hysteresis. It is equally well known that the composition and heat treatment of a piece of metal have a profound effect on the eddy current and hysteresis losses thereof, the sum of which is known as the core loss, so that an indication of this loss may be used to detect differences in pieces of metal that have the same outward physical appearance.

If a piece of metal is placed in the field of a coil in an oscillator circuit, the core loss must be supplied by the oscillator if oscillations are to be sustained. If not, the oscillations will be quenched or decreased in amplitude, if not entirely stopped. This phenomenon, viz: the higher the losses, the lower the amplitude of oscillations, is utilized in the present invention.

A balanced push-pull oscillator is provided with a center-tapped, electrostatically shielded coil (such a coil is described in U. S. Patent No. 2,404,185, issued July 16, 1946, and assigned to the same assignee as this application) which is connected between the grids of the oscillator tubes. This coil is of such dimensions that the pieces of metal to be tested may be inserted herein.

The frequency of the oscillator is determined primarily by the natural period of the coil and may be in the range of 2000 to 5000 cycles, depending on the size of the pieces to be tested, which dictates the dimensions of the coil.

This oscillator, hereinafter referred to as the high frequency oscillator, is plate modulated by low frequency oscillations from a low frequency oscillator, the oscillations of which may be of the order of 103 or 105 cycles, which is not a multiple of the 60 cycle power line frequency.

Since this is a push-pull triode high frequency oscillator, plate modulation results in a non-linear modulation characteristic. As the amplitude of the high frequency oscillations decreases, the complex variation in the transconductance of these triodes with the plate currents decreases the effect of the variation of the plate supply voltage on the instantaneous plate currents, which results in a modulation envelope decreased in amplitude an amount determined by the decrease in amplitude of the high frequency oscillations. Thus a definite correlation exists between the amplitude of the high frequency oscillations and the amplitude of the modulation envelope. As previously indicated there is a correlation between the metallurgical properties of the metal pieces to be tested and the amplitude of the high frequency oscillations. The amplitude of the modulation envelope therefore correlates with the properties of the metal pieces to be tested.

The modulated high frequency is passed through suitable amplifiers and filters to a demodulator. The output of the demodulator, which is of the form of the low frequency originally used to modulate the high frequency oscillator is filtered to remove all traces of the high frequency, amplified and mixed with a portion of the original low frequency taken directly from the low frequency oscillator. A phase shifter and amplitude controls are incorporated in the circuits between the low frequency oscillator and the mixer so that the output of the mixer can be reduced to zero by causing the two signals to be 180 degrees out of phase and of equal amplitudes, with one specimen in the coil. Another specimen having different characteristics, when inserted in the coil, will then cause the amplitudes and phase of these two signals to be different, thus causing the output of the mixer to be appreciable. This output signal is then utilized as described above.

It has been found that with this invention an indication of minute differences in core losses can be detected, and by means of suitable sorting mechanisms, metal pieces may be rapidly sorted into groups in accordance with their metallurgical properties, such as heat treatment, case depth, etc., thus providing a rapid, non-destructive inspection method.

The invention may be understood from the description in connection with the accompanying drawings, in which:

Fig. 1 is a block diagram of connections;

Fig. 2 is a diagram of a portion of the connections; and

Fig. 3 is a diagram of the remainder thereof.

Reference characters 1–12 indicate a very stable oscillator which is amplitude-modulated. It comprises vacuum tubes 2. A lead 3 extends from a source of positive potential which is regulated to keep the voltage constant.

Load resistances 4 and 5 are placed between the lead 3 and the plates of the duplex triode 2. A condenser 6 is provided between the adjacent ends of the load resistances 4 and 5 and ground. Condensers 7 and 8 of the same capacitances are located between the plates of tube 2 and variable duplicate resistances g which are connected through adjustable contacts on these resistances to the grids of tube 2 and to opposite ends of inductance coil 10 of large diameter and short axial length which has its center-point 11 grounded. The tube 2 is provided with cathode-biasing resistances 12 that are connected to ground.

Condensers 14 and 15 couple the plates of tube 2 to duplicate gain control resistances 16. Sliding contacts 17 and 18 are provided on resistances 16 and are connected to the grids of the push-pull amplifier 20, the cathodes of which are biased by resistances 21 connected to ground. A lead 22 from lead 3 is connected through resistance 23, and a condenser 24 is connected between the end of resistance 23 and ground. Load resistances 25 and 26 are provided between the resistance 23 and the plates of the tube 20. Coupling condensers 27, 28 and leads 31, 32 couple the plates of tube 20 to the control grids of two pentodes. Inductances 29 and 30 are provided between the leads 31 and 32 and ground. The leads 31 and 32 extend to the control grids of pentodes 33 and 34, the cathodes of these tubes being biased by resistance 35 extending from them to ground. The tubes 33 and 34 are push-pull amplifier tubes with the resistance 36 providing proper potential for the screen grids of these tubes.

A lead 38 extends from lead 39, which is at a higher potential than lead 3, to load resistances 40 and 41 for the tubes 33 and 34. The output leads 42 and 43 from tubes 33 and 34 extend to the vertical deflection plates 44' of cathode-ray tube 45, shown diagrammatically. This tube 45 is connected so that its cathode and grid are highly negative.

A beam-positioning network consisting of parallel resistances 46 and 47 is connected by sliding contacts on these resistances through resistances 48 and 49 to the leads 42 and 43. Condensers 50 and 51 are connected between these sliding contacts and ground. One end of resistances 46 and 47 is connected by lead 53 to line 54, which extends from a source of positive potential which is half that of lead 3. Lead 54 extends to one end of resistances 55 and 56, which are part of the positioning network for the vertical deflecting plates of the tube 45. Adjustable contacts on these resistances are connected through resistances 57 and 58 to the horizontal deflecting plates 44 of the cathode-ray tube 45.

Lead 59 extends from the two positioning networks to the lead 60, which is connected to the potentiometer 61 a short distance from the ground where the potential is somewhat negative.

The connections for modulating the higher frequency with low frequency oscillations will now be described. A lead 65 extends from lead 3 through resistance 66 and the primary 67 of a transformer 68 to a plate 69 of duplex triode 70, the cathode of which is biased by resistance 71 which may be an electric lamp connected to ground. The voltage of lead 65 is kept constant by a constant voltage regulator 72.

The tuned circuit, grounded at one end and consisting of inductance 75 and condenser 76 which are connected in parallel, and coupled by resistance 77 to grid 78 of tube 70, constitutes a low frequency oscillator. Resistance 79 is a grid-leak resistance for grid 78.

The ends of secondary 80 of transformer 68, the midpoint of which is grounded, are connected to potentiometers 81, 82 which are provided with sliding contacts 83 and 84 that are connected to the grids of a push-pull amplifier 85 of which the cathodes are biased by resistance 86. The plates of amplifier 85 are connected to lead 3 through loading inductances 87, 88 which constitute the primary of a transformer 89, the secondary 90 of which is located in lead 3 beyond the filter consisting of resistance 91 and condenser 92.

The primary 67 of transformer 68 is coupled by condenser 95 to the grid 96 of triode 103 having a grid leak 97, and the corresponding cathode is loaded by the primary 98 of transformer 99. The secondary 100 of this transformer is grounded at its midpoint, one end being connected to a variable resistance 101 and the other end being coupled by condenser 102 to the same resistance 101, thus providing a phase-shifting device when positive potential is applied to the plate of tube 103.

This phase-shifter 99—102 is coupled by condenser 105 and resistance 106 to the control grid of the pentode 107, this grid of tube 107 being provided with a grid leak resistance. The cathode of tube 107 is connected to the cathode of tube 108, these cathodes being biased by resistance 109. The proper positive potential is applied through lead 39 to the plates of the balanced phase inverter comprising tubes 107 and 108 through like resistances 110, 111 and to the screen grids of these tubes through resistance 112 so that signals of equal alternating potentials of opposite polarities, which have the frequency of the input signal, are taken off of the plates of these tubes in the known way and coupled by capacitances 114 and 115 to the horizontal deflection plates 44 of cathode-ray tube 45.

Lead 118 extends from one of the cathodes of tube 20 (Fig. 2) and lead 119' extends from the cathode of tube 103 to an automatic sorting device shown in Fig. 3. Condenser 119 (Fig. 3) couples the lead 118 to a choke coil 122 which is provided so as to by-pass or filter out any low frequency, thus leaving a high frequency signal with a low frequency envelope to be applied to the grid of tube 120. This tube has its cathode biased by resistance 121.

A lead 123 extends to the plate of tube 120 from a source of positive potential, and is provided with a filter consisting of condenser 124 and resistance 125. The load resistance of tube 120 is indicated at 126.

The condenser 127 couples the output of tube 120 to the plate of a diode rectifier 128 across the resistance 129. A high frequency filter network 130 is provided for the current that is rectified at 128. The output of this filter 130 is the low frequency sinusoidal envelope of the modulated high frequency signal that is fed to the tube 120. This output is fed to the grid of vacuum tube amplifier 131, having a grid leak 132 and a cathode biased by resistance 133.

The output of the tube 131 is coupled by condenser 134 to the grid of tube 135 that is an impedance transformer provided with grid leak 136 and with a cathode load resistance 137. The output across the load 137 is sinusoidal, and is of the same frequency as the low frequency modulation of the signal that is fed to the tube 120. Its wave form is that of the envelope of the high frequency fed to tube 120.

A signal form, of the same low frequency as that which modulated the signal that is fed in at 118, is coupled from the cathode of tube 103, Fig. 2, by lead 119' and condenser 140, Fig. 3, to the grid of triode 141 which has a grid leak 142 and has its cathode loaded by the primary 143 of the transformer 144. The secondary 145 of this transformer is center-tapped to ground as indicated at 146. This secondary constitutes a portion of a 180° phase-shifting device which includes the condenser 147 and variable resistance 148.

The signal from the phase-shifter 145—148 is coupled by condenser 149 and lead 150 to a mixing network consisting of fixed resistances 151, 152 and variable resistance 153. The output of the cathode-loaded tube 135 is also coupled to this mixing circuit, so that two voltages are thus impressed across this mixer, one of these voltages being the envelope voltage of the modulated high frequency from oscillator 1 that was rectified at 128, filtered at 130, and amplified at 131 and 135, and the other being the amplified low frequency voltage produced by the low frequency oscillator 67—79, amplified by amplifiers 103 and 141, and taken off of phase shifter 145—148 and coupled by condenser 149 and lead 150 to this mixer. The voltages applied to this mixer therefore have the same frequency and practically the same wave form, since the circuits described cause little if any distortion. The amplitudes of these two voltages may be made equal to each other or they may be made considerably different by means of the gain controls in the circuits. Their phases can be matched as desired by the phase-shifting device 145—148. When their amplitudes are the same and their phases differ by 180°, the output from the mixer 151—155 is zero with the contact 154 at the center of resistance 153. This output varies with differences either in the amplitudes or in the phases of these two voltages.

The output voltage from the mixer 151—155 is fed to the grid of an amplifying tube 158 of which the cathode is biased by resistance 159. The plate load resistance of this tube is shown at 160.

The output of tube 158 is used as follows: One portion passes through the filtering network 161, consisting of resistances and capacitances. This network is adapted to reject the second harmonic of the low frequency output of the amplifier 158. This second harmonic is found to be present when the first harmonic is balanced to zero in the mixer 151—155. Therefore, it is desirable to remove the second harmonic before amplifying the signal and applying it to a cathode-ray tube for observation.

The output from network 161 is coupled by condenser 162 to the grids of the push-pull amplifier tubes 163 and 164 which are adapted in a known way to provide signals of opposite polarities which are applied to the vertical deflection plates 166 of a cathode-ray tube 167. The beam-positioning networks for this tube are shown at 168 and 169 with their connections to positioning potentiometers.

The output voltage of tube 158 is also coupled by lead 170 and condenser 171 to the grid of thyratron 172 which has an adjustable grid bias resistance 172', one end of which is connected to a negative potential applied at the arrow. The plate of this thyratron is connected to the grid of triode 173, and its cathode is biased by resistance 174. The plate load of this triode 173 is the magnetic coil of a small relay 176 which operates a larger relay 177 connected to a power circuit 178. When the thyratron 172 fires because of sufficient voltage being applied to its grid, the voltage at its plate and at the grid of triode 173 goes down to a very low value. The cathode of triode 173 is kept at half of the maximum potential that is normally on its grid. Therefore its plate draws current during non-firing time of the thyratron, thus keeping relay 176 closed. The resistances and potentials are so adjusted that when the thyratron 172 fires its plate voltage falls below the cathode voltage on the triode 173, the plate of this triode ceases to draw current, and the relay 176 opens. The larger relay 177 which is controlled by the relay 176 may be used to control a circuit, not shown, for operating a sorting device for the specimens that are tested by passing them through the coil 10.

A resistance-inductance oscillator tube 180 is also provided (Fig. 3). Its frequency may, for example, be 2000 C. P. S. The primary 181 of the transformer 182 is in the plate circuit of tube 180. The secondary 183 of this transformer is in the grid circuit of this tube. One end of this secondary 183 is connected to the grid of tube 180, and the other end is grounded. The cathode of tube 180 is biased by resistance 184.

The output from the oscillator 180—184 is adapted to be coupled through switch 191 by condenser 186 and resistance 187 to a push-pull amplifier comprising pentodes 188 and 189 connected in a known way similarly to the tubes 163 and 164 so as to provide the signals of opposite polarity and of the frequency of oscillator 180—184 for the horizontal deflection plates 190 of the cathode-ray tube 167.

A switch 191 is provided to connect the push-pull amplifier 188—189 to the lead 192 which is connected to lead 150 in which a switch 191' is located and ganged with switch 191. In this way provision is made for assuring a 180° phase difference between the output of the phase shifter 145—148 and the signal out of amplifier tube 135. This is accomplished by switching the ganged switches 191 and 191' from contacts $a$ and $a'$ to $b$ and $b'$ simultaneously. This puts the signal from the phase shifter 145—148 on the vertical deflection plates 166 of cathode-ray tube 167 and since the envelope signal of the same frequency from the tube 135 is on the horizontal deflecting plates 190 of this tube the phase angle can then be read directly by the pattern on the tube.

The operation is as follows:

(a) Adjust the grid of thyratron 172 to the cut-off point by moving contactor on resistor 172'.

(b) Put a specimen that has high core losses when subjected to alternating current fields in coil 10 of H. F. oscillator 1 unmodulated and adjust the feedback by adjusting resistances $g$ that are connected to the grids of tube 2 until oscillations are almost quenched as shown on cathode-ray tube 45.

(c) Remove specimen from coil 10 and substitute a good specimen and adjust gain by control 16 until practically full scale deflection is shown on cathode-ray tube 45.

(d) Introduce a modulating voltage to oscillator 1—12 by increasing the gain of modulator 85 by means of control 81—84 of this push-pull circuit to produce usually not more than about 50% modulation so that no objectionable amount of harmonics will be introduced into the signal.

(e) Adjust the output voltage of the mixer 151—153, Fig. 3, with no specimen in the coil 10, by adjusting the phase shifter 145—148 and contact 154 on resistance 153 until the pattern on the cathode-ray tube 167 is a straight line along the x-axis, which means no signal to amplifier tube 158 and the following circuit to produce any vertical deflection of the cathode-ray beam in tube 167. Under this condition no signal from tube 158 is applied to the grid of thyratron 172.

(f) A specimen to be tested is then introduced into the coil 10, thereby altering the circuit loss with a decrease in the amplitude of the high frequency oscillations from oscillator 1. These reduced oscillations are modulated by low frequency oscillations from oscillator 67—79 through push-pull amplifier 85. The modulated signal is rectified at 128 and amplified by amplifiers 131 and 135 and fed to mixer 152—155. This rectified output no longer balances the output from phase shifter 145—148 to the mixer 152—155 so that an output signal due to this unbalance will be applied to grid 154 of tube 158 and amplified and applied to the vertical deflection plates 166 of tube 167, causing the pattern thereon to be rectangular.

(g) When the output from tube 158 is sufficient to trigger the thyratron 172 due to the increase in potential on its grid, caused by passing a sample through coil 10, this thyratron conducts and decreases the potential on the grid of tube 173 and cuts off the current through coil 176 thus causing the relay 177 to open. These relays may be used to control circuits indicated by block 195 to separate the specimens automatically into groups as they pass through the coil 10 in accordance with their core losses, or this may be done by hand as the operator watches the signals on the cathode-ray tube 167 when the different specimens are placed in the coil 10.

(h) It will be clear from the description that if the amplitude of the signal from the mixer 151—153 is not sufficiently large to trigger the thyratron 172 it will not conduct and the relay 176 will remain open. The setting of the grid bias of thyratron 172 by adjusting the contactor on resistance 172' will determine what output from the plate of tube 158 will trigger the thyratron 172 and cut off the current through relays 176 and 177. By decreasing this grid bias a smaller output from the mixer will trigger the thyratron 172. Then specimens in coil 10 which almost quench the high frequency oscillations will trigger the thyratron; and those which have less quenching effect, due to a smaller amount of core losses, will not trigger it.

As shown on the drawings, cathode-ray tubes are connected to various critical portions of the circuit at all times, so as to facilitate adjustment of the various controls and provide the operator with visual indications that all circuits are in correct adjustment.

The differences in core losses of the metal pieces which are to be tested by this device may be due to a variety of conditions resulting from the sort of metals used and the heat treatments or metallurgical process which they have undergone. In some cases the specimens which have high core losses, and therefore have large quenching effect on the high frequency oscillator 1, are the desirable ones. It is obvious that they can be separated from the others by utilizing this device.

What is claimed is:

1. The method of comparing the metallurgical and physical properties of metal pieces according to the correlation of said metallurgical and physical properties with the core losses of said pieces at a fixed frequency, which comprises varying the amplitude of oscillations of an oscillatory circuit by placing said metal pieces one at a time in the field of a coil which is a part of said oscillatory circuit, the amplitude of said oscillations varying according to the core loss characteristics at said frequency, modulating said oscillations at a lower frequency, the amplitude of the modulation varying in accordance with the amplitude of said oscillations, detecting the modulated oscillations to obtain the low frequency envelope, shifting the phase of a portion of the modulation frequency 180°, mixing said low frequency envelope with said portion of the modulating frequency to obtain a signal which varies in amplitude in accordance with the properties of said pieces, utilizing said signal to control the firing of a gaseous discharge device, the firing of said gaseous discharge device in turn controlling the operation of a relay.

2. Apparatus for comparing the metallurgical and physical properties of metal pieces according to the correlation of said metallurgical and physical properties with the core losses of said pieces at a fixed frequency, which comprises a first oscillatory circuit having a coil as part thereof, the electrical characteristics of said coil being varied in accordance with said core losses of said metal pieces when placed in the electrical field thereof, a second oscillatory circuit operating at a lower frequency than that of said first oscillatory circuit, a modulator to modulate said first oscillatory circuit at the frequency of said second oscillatory circuit, a rectifier to detect the output of said first oscillatory circuit to obtain the modulation envelope, a phase shift circuit to shift the phase of a portion of the output of said second oscillatory circuit 180°, a mixer circuit to mix said modulation envelope with said portion, a gaseous discharge device connected to the output of said mixer circuit, and a relay connected to be operated by the firing of said gaseous discharge device.

ESTLE RAY MANN.
HAROLD EDWARD BESTE.

REFERENCES CITED

The following references are of record in the file of this patent:

UNITED STATES PATENTS

| Number | Name | Date |
|---|---|---|
| Re. 21,927 | Brace et al. | Oct. 21, 1941 |
| 1,943,619 | Mudge et al. | Jan. 16, 1934 |
| 1,984,465 | Dana | Dec. 18, 1934 |
| 1,996,906 | De Lanty | Apr. 9, 1935 |
| 2,070,666 | Llewellyn | Feb. 16, 1937 |
| 2,176,973 | Bowman-Manifold | Oct. 24, 1939 |
| 2,186,388 | Moritz, Jr. | Jan. 9, 1940 |
| 2,227,505 | Kummerer | Jan. 7, 1941 |
| 2,237,254 | Broekhuysen | Apr. 1, 1941 |
| 2,267,884 | Zuschlag | Dec. 30, 1941 |
| 2,280,226 | Firestone | Apr. 21, 1942 |
| 2,285,152 | Firestone | June 2, 1942 |
| 2,329,811 | Zuschlag | Sept. 21, 1943 |
| 2,355,363 | Christaldi | Aug. 8, 1944 |
| 2,374,666 | Cunniff | May 1, 1945 |